United States Patent

Akimoto et al.

[11] 4,326,337
[45] Apr. 27, 1982

[54] MEASURING INSTRUMENT FOR THE PROFILE OF PILED CHARGE OF A BLAST FURNACE

[75] Inventors: Keiichi Akimoto, Kurashiki; Tsuyoshi Tsuchida, Kobeshi, both of Japan

[73] Assignee: Kawasaki Seitetsu Kabushiki Kaisha, Kobeshi, Japan

[21] Appl. No.: 145,697

[22] Filed: May 1, 1980

[51] Int. Cl.³ .......................... G01B 5/20; G01B 7/28
[52] U.S. Cl. .............................. 33/174 PA; 33/126.6
[58] Field of Search ............... 33/126.5, 126.6, 174 P, 33/174 PA; 164/4, 150, 156, 450

[56] References Cited

U.S. PATENT DOCUMENTS

| | | | |
|---|---|---|---|
| 3,135,055 | 6/1964 | Butler et al. | 33/174 P |
| 3,481,043 | 12/1969 | Esch | 33/174 P |
| 3,816,932 | 6/1974 | Legille | 33/174 P |
| 4,141,148 | 2/1979 | Noguchi | 33/174 P |
| 4,219,133 | 8/1980 | Sinsky | 33/126.6 |

FOREIGN PATENT DOCUMENTS 1088196 3/1955 France .............................. 33/126.6
619214 3/1961 Italy .................................. 33/174 P Primary Examiner—Richard R. Stearns
Attorney, Agent, or Firm—Oblon, Fisher, Spivak, McClelland & Maier

[57] ABSTRACT

An apparatus for measuring the piling profile of a blast furnace charge is disclosed. The apparatus includes a guide pipe having a distal end extending into the furnace. Means are provided for moving the guide pipe radially into and out of the furnace and for detecting the radial position of the guide pipe. A rope extends through the guide pipe to the distal end thereof and forms a loop at the distal end which extends around a pair of pulleys and which includes a plumb movably mounted on the loop. Means are provided for winding and unwinding the rope and for detecting the tension of the rope so that the contact of the plump with the charge can be detected. Means are provided for determining the position of the rope at such contact and for measuring the piling profile of the furnace charged based upon the guide pipe position and rope position at said contact.

2 Claims, 3 Drawing Figures

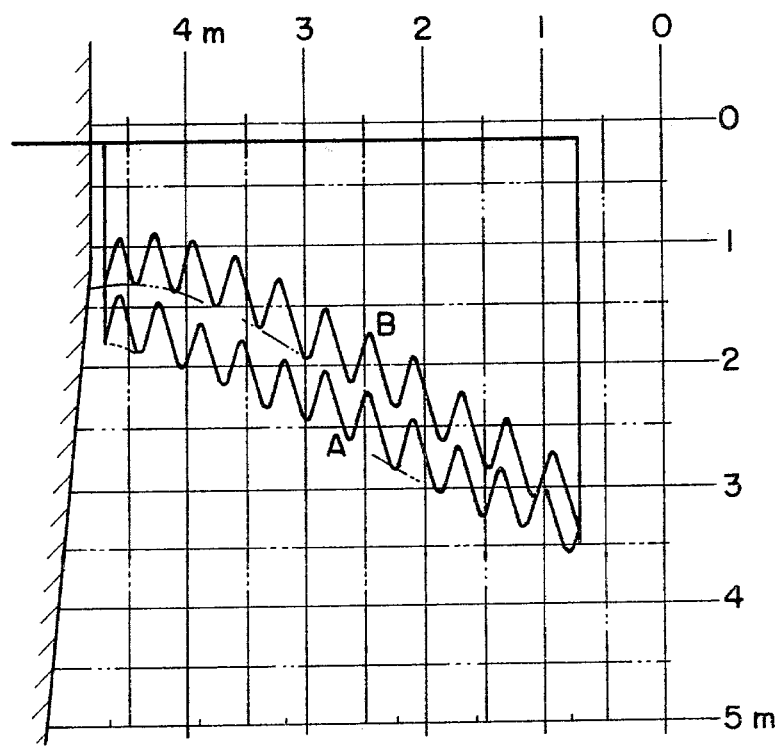
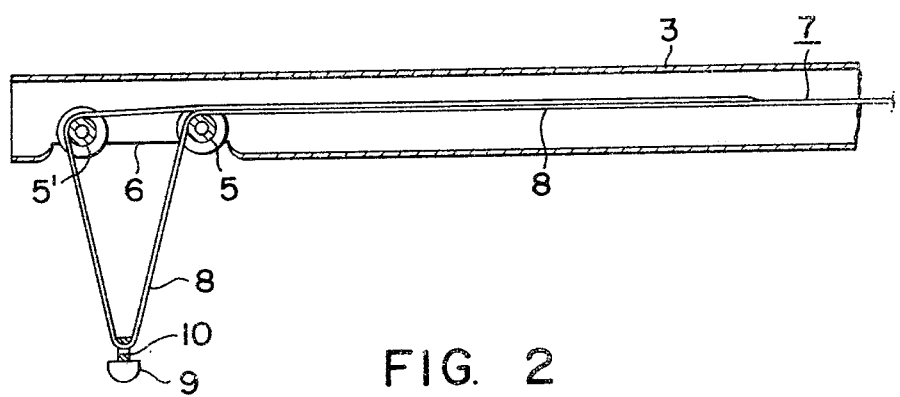
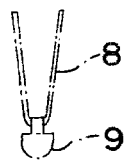
FIG. 3
FIG. 2

MEASURING INSTRUMENT FOR THE PROFILE OF PILED CHARGE OF A BLAST FURNACE

BACKGROUND OF THE INVENTION

1. Field of the Invention

The present invention is concerned with a measuring instrument for the profile of a piled charge of a blast furnace.

2. Description of the Prior Art

Distribution of gas flow in a blast furnace is one of the most important factors related to the stable operation of the blast furnace. The distribution of the gas flow is closely connected with the piling condition of the material and fuel charged in the furnace. Therefore, the piling condition of the charge (hereinafter called "profile of the charge") must be controlled to keep the distribution of gas flow under control. Therefore, many of the current blast furnaces are equipped with a charge distributer plate (movable armor) which changes the piling profile of the raw material and fuel when they are charged, to control the profile of the charge, and consequently the distribution of gas flow in the furnace.

Therefore it is necessary to measure the profile of the charges at any given time to control the distribution of gas flow. Various means of measuring the profile of the charge have been proposed, which are generally classified as either non-contacting systems adopting electromagnetic waves, ultrasonic waves, radioactive rays, etc., and contacting systems employing a plumb measuring device.

The present invention belongs to the latter group, a contacting system, of which the prior art structure is devised to run a wire rope through a guide pipe which moves horizontally to the radial direction in the furnace. A plumb is attached to the end of the wire rope and hangs down, and the contact of the plumb to the charge surface is detected by a detector installed outside of the furnace and the depth of charge surface from the guide pipe is thus measured. The guide pipe is moved in the radial direction to measure several points on the radial direction, to estimate the profile of the charge.

In the prior art as described above, the plumb is lifted to the position of the guide pipe while the pipe is being moved, so that the plumb will not swing with the movement of the guide pipe being relocated.

Therefore, the prior art method has the disadvantage of taking too-much time for the measuring operation due to the number of steps involved, such as lowering the plumb, detecting the contact, raising the plumb, and shifting the guide pipe. Because charges are usually sinking at a rate of about 10 cm/min., in the case of making measurements at several points to determine the complete profile, the time required from the first measurement to the last is too long, causing changes in the profile of the charge itself, resulting in a drawback of inability of making an accurate configuration measurement.

SUMMARY OF THE INVENTION

The first object of the present invention is to provide a device for measuring the piling profile of the charge of a blast furnace which allows the reduction of measuring time by quick detection of the contact of the plumb with the charge. The second object is to provide a measuring device for the piling profile of the charge of a blast furnace which results in reducing measuring time by preventing the swinging of the plumb.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 2 is a sectional view indicating the relation between a plumb and a wire rope and;

FIG. 3 is a diagram indicating the trace of the motion of the plumb.

DETAILED DESCRIPTION OF THE PREFERRED EMBODIMENTS

Figure 1:
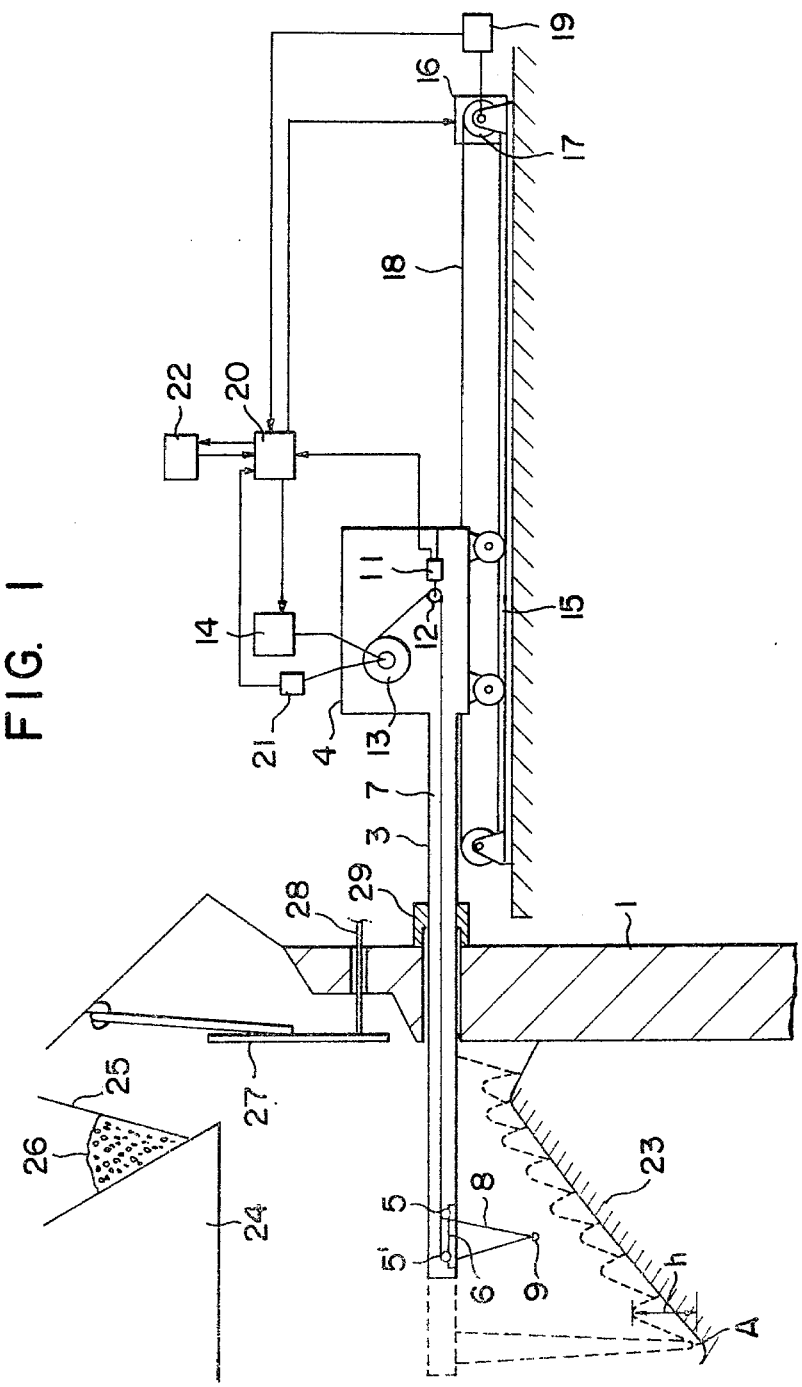
FIG. 1 is a schematic drawing showing the whole arrangement of the device.

A description of the embodied structure of the present invention is made by referring to the exemplary embodiment shown in the drawings in which a guide pipe moves in the radial direction through the furnace wall 2 of a blast furnace 1 and is fixed to a case 4. Two pulleys 5 and 5' are attached to the inner wall of the end of the guide tube 3 in a manner to rotate freely, and an opening 6 is formed in the lower portion of the tube 3 adjacent both pulley 5 and 5'. A looped portion 8 (see FIG. 2) is formed in an end of a wire rope 7 running through the guide pipe 3, one end of the loop 8 passing around the pulley 5 and the other end around the pulley 5', and the looped portion hanging down into the furnace through the opening 6 and passing through the eye-hole 10 formed in a plumb 9 to locate the plumb 9 always at the mid point of the two pulleys 5 and 5', for the purpose of preventing swinging during the shifting of the guide pipe 3. The wire rope 7 is wound around a wire drum 13 installed in the case 4 after passing around a pulley 12 which is installed in a load detector 11 fixed in the case 4. The wire drum 13 is devised to rotate in either direction by a drum driving device 14.

The case 4 sits on the rail 15, and is attached, at its front and rear, to the ends of a chain band 18, which passes round a chain wheel 17 being driven by a guide pipe driving device 16, and is devised to be driven horizontally be rotation of the chain wheel 17. The signal from a revolution counter 19 installed on the shaft of the chain wheel 17 is fed to the detecting controller 20, which detects and stores the position of the guide pipe 3. It is also devised to send out an operation starting signal from the detecting controller 20 to the guide pipe driving device 16. The detecting controller 20 is further arranged to be fed with the signal from the load detector 11. Further, the detecting controller 20 sends out drive starting and stopping command signals to the driving device 14, and is made to receive and store the signal from a revolution detector 21 installed on the shaft of the wire drum 13. A timer 22 is also connected to the detecting controller 20.

The drum driving device 14 performs driving and stopping of the device in accordance with the signals from the detecting controller 20, employing, for example, a brake motor. And, it is devised to detect the revolution of the wire drum 13 by way of the revolution counter 21, and to feed the signal to the detecting controller 20 and make the controller store the signal.

The load detector 11 detects the load, employing for example a strain-resistance load cell or a magnetostrictive load meter, and feeds the signal of load change due to contact to the detecting controller 20, to make it send out a drum drive stopping signal to stop the driving of the drum.

The guide pipe driving device 16 employs for example, a geared electric motor started by the signal issued from the detecting controller 20 and is stopped by limit switches (not shown in the drawing) installed at a certain determined distance. Revolution of the chain wheel 17 is detected by the revolution counter 19, and the signal is fed into the detecting controller 20 and stored in it.

Various types of known devices can be adopted as the revolution counters 19 and 21.

In the drawing, reference numeral 23 is a charge, 24 is a bell, 25 is a hopper, 26 is a charge, 27 is movable armor, 28 is a operating rod and 29 is a gas seal fitting.

In the present invention, the end of the guide pipe 3 is moved by the guide pipe driving device 16 to the deepest measuring point, and stopped. Then the drum driving device 14 is driven to feed out the wire rope 7 and lower the plumb 9. The load detector 11 will be preadjusted to reduce the output signal to 0 (zero), when the plumb 9 is housed in the guide pipe 3. Because the looped portion 8 of the wire rope 7 is passing through the eye hole 10 of the plumb 9, the plumb 9 is always located at the midpoint of the pulleys 5 and 5' when it is lowered as the rope 7 is being veered away. Then, when the plumb 9 reaches the surface of the charge 23, the power signal of the load detector 11 is changed. The signal is fed to the detecting controller 20, which in turn issues a commanding signal to the drum driving device 14 which causes wire drum 13 to stop. During these operation, revolutions of the wire drum 13 are detected by the revolution counter 21, and the signal is fed to the detecting controller 20, and is converted to the indication of the depth of the charge and the depth value is stored.

Soon after completion of the first measurement, a signal from the detecting controller 20 operates the guide pipe driving device 16 to move the guide pipe 3 in the direction of the outside of the furnace, and at the same time a signal is fed from the detecting controller 20 to a timer 22 and to the drum driving device 14, to drive the latter for centain predetermined time preset by the timer, which pulls up the plumb 9 for a certain distance only (h in FIG. 1). The distance h is determined to be as small as practicable. When the guide pipe 3 is transferred to the subsequent measuring point, it is stopped by stopping the guide pipe driving device 16 by way of a limit switch. The position of the stop is detected by the revolution counter 19, and the signal is fed to the detecting controller 20 and is recorded. The plumb 9 is caused to descend by a command signal from the detecting controller 20 just prior to the guide pipe being stopped, to make it contact with the charge 23 at almost the same time that the guide pipe 3 stops, and measure the depth at that position. The same procedure is repeated to measure for several positions until the points near the furnace wall are covered, and the profile of the charge is obtained.

The trace of the movement of the plumb 9 is shown by a broken line in FIG. 1. By synchronizing the shifting velocity of guide pipe 3 with the lifting or lowering velocity of the plumb 9 in the following relation:

$$\tan h/l > \tan \theta + K$$

where, K is a correction factor given by a positive number,
  θ is angle of repose of the ore,
  l is the pitch of the measurement, levels of each measuring point can be measured in a short time, and an accurate profile of the piling can be measured quickly with the processing of signals of measurement by the detecting controller 20.

FIG. 3 shows the trace of the plumb 9 taking the plumb position as ordinate, and the position of the guide pipe 3 as abscissa. In the drawing, wave form A indicates the status of just prior to charging and the wave form B indicates that of just after charging, and an accurate profile can be measured as shown in the chart.

The above explanation was made where the guide pipe is stopped at the measuring points to detect landing of the plumb 9. An alternate method may also be taken, of not stopping the guide pipe 3 and the plumb 9 is lowered as the guide pipe 3 is being moved to the direction of being pulled out, and the plumb 9 is pulled out as soon as it is landed, and this process is repeated. In this latter case, although the position of measurements varies in accordance with the profile of the charges, the profile can be measured by detecting the landing of the plumb 9 by the load detector 11 and feeding the detecting signal and the signal of the revolution counter 19 to the detecting controller 20 where it is recorded.

The direction of shifting the guide pipe 3 is not necessarily required to be the direction of pulling out of the furnace. Instead, the guide pipe can be moved from the furnace wall side to the center of the furnace, and in this case the distance h of pulling up the plumb 9 can be reduced almost to near zero.

The present invention enables detection to be made easier and also in a short time because of its structure and operations as stated in above example, including detecting the landing of the plumb 9 by measuring the tension of the wire by the load detector 11. The invention also helps to shorten the measuring time and allows one to obtain an accurate charge profile by way of the detecting controller 20 which receives signals from the load detector 11, from revolution counter 19 which detects the position of the guide pipe 3 and from the revolution counter 21 which detects the revolution of the wire drum 13, and which issues each necessary command signal.

Further, the structure of running the looped portion 8 of the wire rope 7 through the eye hole of the plumb 9, keeps the plumb 9 always hanged from both sides, and eliminates the swing of plumb 9 almost completely when the guide pipe 3 is moved. This allows the measurement with a shorter lifting distance and hence with a shorter measuring time.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for measuring the piling profile of a blast furnace charge, comprising:
    a guide pipe including at least a distal end inserted in said blast furnace in a radial direction;

rope means with at least a part of said rope means guidingly extending through said guide pipe, said at least a part of said rope means including a loop extending out of said distal end of said guide pipe at two points;

plumb means slidably attached to said loop of said rope means;

a casing fixed to the other end of said guide pipe;

a load detector fixed to said casing and including pulley means for said rope means, said load detector adapted to detect changes in the tension of said rope means and to generate a signal dependent upon said changes in said tension;

a drum in said casing and adapted to wind and unwind said rope means;

means for rotating said drum;

first revolution counter means adapted to detect the number of revolutions of said drum;

means for moving said guide pipe and said casing in said radial direction;

second revolution counter means adapted to detect the position of said guide tube in said radial direction and to generate a signal dependent upon said position; and detecting controller means adapted to receive said signals from said load detector and said first and second revolution counter means, and including means for calculating the profile of said charge based upon said signals;

whereby said slidable attachment of said plumb means to said loop prevents swinging of said loop during radial movement of said guide pipe.

2. The apparatus of claim 1, including:

an opening in a lower surface of said distal end of said guide tube;

a pair of pulleys positioned in said guide pipe adjacent said opening and aligned in said radial direction;

an eye hole in said plumb means; and said loop extending around said pair of pulleys and through said eye hole, whereby said plumb means is always positioned in a vertical plane located midway between the pulleys of said pair of pulleys.

* * * * *